US012219347B2

(12) United States Patent
Sullivan et al.

(10) Patent No.: US 12,219,347 B2
(45) Date of Patent: *Feb. 4, 2025

(54) SECURE ON-DEMAND ULTRA-WIDEBAND COMMUNICATION CHANNELS SYSTEMS AND METHODS

(71) Applicant: Visa International Service Association, San Francisco, CA (US)

(72) Inventors: Brian Sullivan, Amersham (GB); Aparna Girish, Fremont, CA (US); Mark Rigby, Rickmansworth (GB); Christian Aabye, Redwood City, CA (US); Mustafa Top, San Ramon, CA (US); Yuexi Chen, Foster City, CA (US); Dinah Sloan, San Jose, CA (US); Hao Ngo, San Jose, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/453,693

(22) Filed: Aug. 22, 2023

(65) Prior Publication Data
US 2023/0396998 A1    Dec. 7, 2023

Related U.S. Application Data

(63) Continuation of application No. 17/491,402, filed on Sep. 30, 2021, now Pat. No. 11,785,449.

(51) Int. Cl.
*H04W 12/03* (2021.01)
*H04B 1/7163* (2011.01)
(Continued)

(52) U.S. Cl.
CPC .......... *H04W 12/03* (2021.01); *H04B 1/7163* (2013.01); *H04L 9/088* (2013.01);
(Continued)

(58) Field of Classification Search
CPC ... H04W 12/03; H04W 12/08; H04W 12/041; H04W 12/106; H04W 12/122;
(Continued)

(56) References Cited

U.S. PATENT DOCUMENTS 8,552,903 B2    10/2013   Julian et al.
9,647,832 B2 *   5/2017   Le Saint .................. H04L 9/14
(Continued)

FOREIGN PATENT DOCUMENTS

EP    3273635 A1    1/2018
EP    3748900 A1    12/2020
(Continued)

OTHER PUBLICATIONS

U.S. Appl. No. 17/491,402, "Non-Final Office Action", Feb. 16, 2023, 40 pages.
(Continued)

*Primary Examiner* — Samson B Lemma
(74) *Attorney, Agent, or Firm* — Kilpatrick Townsend & Stockton LLP

(57) ABSTRACT

A method includes forming a communication channel between a user device and an access device. The communication channel is then secured using a user device key pair in the user device and an access device ephemeral key pair in the access device. The access device then generates a session key using at least a private cryptographic key in the access device ephemeral key pair, and a public key in the user device key pair. The access device then uses the session key to secure an ultra-wideband communication channel between the user device and the access device.

20 Claims, 5 Drawing Sheets

(51) Int. Cl.
*H04L 9/08* (2006.01)
*H04L 9/30* (2006.01)
*H04L 9/32* (2006.01)
*H04W 12/041* (2021.01)
*H04W 12/08* (2021.01)
*H04W 12/106* (2021.01)
*H04W 12/122* (2021.01)
*H04W 76/10* (2018.01)

(52) U.S. Cl.
CPC .......... *H04L 9/3073* (2013.01); *H04L 9/3271* (2013.01); *H04W 12/041* (2021.01); *H04W 12/08* (2013.01); *H04W 12/106* (2021.01); *H04W 12/122* (2021.01); *H04W 76/10* (2018.02); *H04L 2209/80* (2013.01)

(58) Field of Classification Search
CPC ...... H04W 76/10; H04L 9/088; H04L 9/3073; H04L 9/3271; H04L 2209/80; H04B 1/7163
USPC ......................................................... 713/171
See application file for complete search history.

(56) References Cited

U.S. PATENT DOCUMENTS

| | | | |
|---|---|---|---|
| 10,759,389 B2 | 9/2020 | Ledvina et al. | |
| 2009/0313472 A1 | 12/2009 | Guccione et al. | |
| 2011/0019587 A1* | 1/2011 | Wang | H04L 63/08 370/254 |
| 2015/0200774 A1 | 7/2015 | Le Saint | |
| 2015/0237461 A1* | 8/2015 | Goyal | H04M 1/02 455/41.2 |
| 2019/0114605 A1 | 4/2019 | Valencia | |
| 2019/0215154 A1* | 7/2019 | Simplicio, Jr. | H04L 9/0866 |
| 2020/0168017 A1* | 5/2020 | Prostko | G01S 13/886 |
| 2021/0027130 A1* | 1/2021 | Ette | G07C 9/00309 |
| 2021/0058259 A1* | 2/2021 | Le Saint | H04L 63/0869 |
| 2021/0266303 A1* | 8/2021 | Pollutro | H04L 63/0435 |
| 2021/0360395 A1* | 11/2021 | Lemsitzer | H04W 12/037 |
| 2021/0402955 A1* | 12/2021 | Ahmed | B60R 25/01 |
| 2022/0078609 A1* | 3/2022 | Appietto | H04W 12/03 |
| 2022/0256338 A1* | 8/2022 | Parthasarathi | H04L 9/0866 |

FOREIGN PATENT DOCUMENTS

| | | |
|---|---|---|
| KR | 20050092989 A | 9/2005 |
| KR | 202000028820 A | 3/2020 |
| KR | 20200112559 A | 10/2020 |
| WO | 2020197221 A1 | 10/2000 |

OTHER PUBLICATIONS

U.S. Appl. No. 17/491,402, "Notice of Allowance", May 26, 2023, 16 pages.
Brzuska et al., "An Analysis of the EMV Channel Establishment Protocol", School of Computer Science, School of Engineering, Available Online at: https://eprint.iacr.org/2013/031.pdf, Nov. 2013, 30 pages.
PCT/US2022/043649, "International Search Report and the Written Opinion", Jan. 2, 2023, 12 pages.
PIRC, "UWB Explained: What Secure Ranging Means for the IoT and Beyond", NXP Semiconductors,, Aug. 4, 2021, 7 pages.
Singh et al., "UWB with Pulse Reordering: Securing Ranging against Relay and Physical-Layer Attacks", Network and Distributed Systems Security (NOSS) Symposium 2019, Available Online at: https://eprint.iacr.org/2017/1240.pdf, Feb. 24-27, 2019, 16 pages.
Stocker et al., "Towards Secure and Scalable UWB-Based Positioning Systems", Institute of Technical Informatics, 2020, 9 pages.
YANG, "Security Enhanced EMV-Based Mobile Payment Protocol", Hindawi Publishing Corporation, the Scientific World Journal, vol. 2014, Article Id 864571, Sep. 15, 2014, 19 pages.
EP22877122.6, "Extended European Search Report", Dec. 12, 2024, 12 pages.

* cited by examiner

SECURE ON-DEMAND ULTRA-WIDEBAND COMMUNICATION CHANNELS SYSTEMS AND METHODS

CROSS-REFERENCE TO RELATED APPLICATIONS

This Application is a continuation of U.S. patent application Ser. No. 17/491,402, filed Sep. 30, 2021, the entirety of which is incorporated by reference herein.

BACKGROUND

Ultra-wideband (UWB) is a wireless technology that can be used to provide accurate distance and direction between two or more devices. Ultra-wideband provides a high degree of accuracy for distance (e.g., within 10 cm) and direction (e.g., within 3 degrees). It is far more accurate than BLE/beacons for location determination, and does not need multiple devices that have a fixed and known location to perform triangulation.

Typically ultra-wideband communication is performed between two known devices that are paired by a user, for example, a phone and location determination device. However, systems can include many devices that can communication with one another. For example, a particular location can have many access devices and user devices. Each potential access device/user device pair may communicate with one another for the first time with no prior knowledge of the other device. Secure on-demand ultra-wideband communication between unknown devices is a technical challenge.

Embodiments of the disclosure address this problem and other problems individually and collectively.

SUMMARY

One embodiment is related to a method comprising: forming a communication channel between a user device and an access device; securing the communication channel between the user device and the access device using a user device key pair in the user device and an access device ephemeral key pair in the access device; generating, by the access device, a session key using at least a private cryptographic key in the access device ephemeral key pair and a public cryptographic key in the user device key pair; and using, by the access device, the session key to secure an ultra-wideband communication channel between the user device and the access device.

Another embodiment is related to an access device comprising: a processor; and a computer-readable medium coupled to the processor, the computer-readable medium comprising code executable by the processor for implementing a method comprising: forming a communication channel between a user device and an access device; securing the communication channel between the user device and the access device using a user device key pair in the user device and an access device ephemeral key pair in the access device; generating, by the access device, a session key using at least a private cryptographic key in the access device ephemeral key pair and a public cryptographic key in the user device key pair; and using, by the access device, the session key to secure an ultra-wideband communication channel between the user device and the access device.

Another embodiment is related to a method comprising: forming a communication channel between a user device and an access device; securing the communication channel between the user device and the access device using a user device key pair in the user device and an access device ephemeral key pair in the access device; generating, by the user device, a session key using at least a private cryptographic key in the user device key pair and a public cryptographic key in the ephemeral key pair; and using, by the user device, the session key to secure an ultra-wideband communication channel between the user device and the access device.

Further details regarding embodiments of the disclosure can be found in the Detailed Description and the Figures.

DETAILED DESCRIPTION

Figure 1:
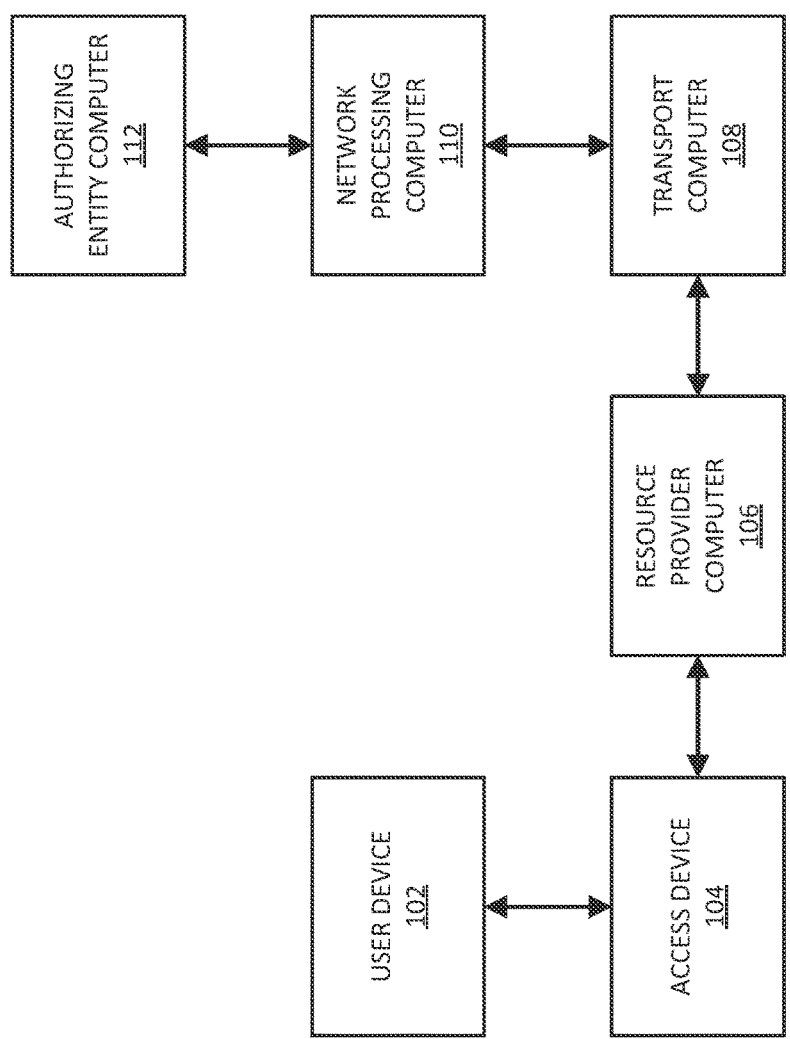
FIG. 1 shows a block diagram of a secure communication system according to embodiments.

Prior to discussing embodiments of the disclosure, some terms can be described in further detail.

A "user" may include an individual. In some embodiments, a user may be associated with one or more personal accounts and/or mobile devices. The user may also be referred to as a cardholder, account holder, or consumer in some embodiments.

A "user device" may be a device that is operated by a user. Examples of user devices may include a mobile phone, a smart phone, a card, a personal digital assistant (PDA), a laptop computer, a desktop computer, a server computer, a vehicle such as an automobile, a thin-client device, a tablet PC, etc. Additionally, user devices may be any type of wearable technology device, such as a watch, earpiece, glasses, etc. The user device may include one or more processors capable of processing user input. The user device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. Examples of remote communication capabilities include using a mobile phone (wireless) network, wireless data network (e.g., 3G, 4G, 5G, or similar networks), Wi-Fi, Wi-Max, or any other communication medium that may provide access to a network such as the Internet or a private network.

A "mobile device" may include any suitable electronic device that may be transported and operated by a user, which may also provide remote communication capabilities to a network. A mobile communication device may communicate using a mobile phone (wireless) network, wireless data network (e.g., 3G, 4G, 5G, or similar networks), Wi-Fi™, Bluetooth©, Bluetooth© Low Energy (BLE), Wi-Max, or any other communication medium that may provide access to a network such as the Internet or a private network. Examples of mobile devices include mobile phones (e.g., cellular phones), PDAs, tablet computers, net books, laptop computers, wearable devices (e.g., watches), vehicles such as automobiles and motorcycles, personal music players, hand-held specialized readers, etc. A mobile device may comprise any suitable hardware and software for performing such functions, and may also include multiple devices or components (e.g., when a device has remote access to a network by tethering to another device—i.e., using the other device as a modem—both devices taken together may be considered a single mobile device).

An "access device" may be any suitable device that provides access to a remote system. An access device may also be used for communicating with a coordination computer, a communication network, or any other suitable system. An access device may generally be located in any suitable location, such as at the location of a merchant. An access device may be in any suitable form. Some examples of access devices include POS or point of sale devices (e.g., POS terminals), cellular phones, personal digital assistants (PDAs), personal computers (PCs), tablet PCs, hand-held specialized readers, set-top boxes, electronic cash registers (ECRs), vending machines, automated teller machines (ATMs), virtual cash registers (VCRs), kiosks, security systems, access systems, and the like.

An access device may use any suitable contact or contactless mode of operation to send or receive data from, or associated with, a mobile communication or payment device. For example, access devices can have card readers that can include electrical contacts, radio frequency (RF) antennas, optical scanners, bar code readers, or magnetic stripe readers to interact with portable devices such as payment cards.

An "interaction" may include a reciprocal action or influence. An interaction can include a communication, contact, or exchange between parties, devices, and/or entities. Example interactions include a transaction between two parties and a data exchange between two devices. In some embodiments, an interaction can include a user requesting access to secure data, a secure webpage, a secure location, and the like. In other embodiments, an interaction can include a payment transaction in which two devices can interact to facilitate a payment.

"Interaction data" can include data related to and/or recorded during an interaction. In some embodiments, interaction data can be transaction data of the network data. Transaction data can comprise a plurality of data elements with data values.

A "resource provider" may be an entity that can provide a resource such as goods, services, information, and/or access. Examples of resource providers includes merchants, data providers, transit agencies, governmental entities, venue and dwelling operators, etc. A "merchant" may typically be an entity that engages in transactions and can sell goods or services, or provide access to goods or services.

An "authorization request message" may be an electronic message that requests authorization for an interaction. In some embodiments, it is sent to a transaction processing computer and/or an issuer of a payment card to request authorization for a transaction. An authorization request message according to some embodiments may comply with International Organization for Standardization (ISO) 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction value, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g., POS equipment) that indicates approval of the transaction. The code may serve as proof of authorization.

An "authorizing entity" may be an entity that authorizes a request. Examples of an authorizing entity may be an issuer, a governmental agency, a document repository, an access administrator, etc. An authorizing entity may operate an authorizing entity computer. An "issuer" may refer to a business entity (e.g., a bank) that issues and optionally maintains an account for a user. An issuer may also issue payment credentials stored on a user device, such as a cellular telephone, smart card, tablet, or laptop to the consumer, or in some embodiments, a portable device.

An "authorizing entity computer" or "authorization computer" may include any computer system that performs functions associated with authorizing certain actions. For example, an authorizing entity computer may authorize transactions between customers and merchants. An authorizing entity computer may be operated by an "authorizing entity." An authorizing entity computer can be an issuer computer.

"Credentials" may comprise any evidence of authority, rights, or entitlement to privileges. For example, access credentials may comprise permissions to access certain tangible or intangible assets, such as a building or a file. Examples of credentials may include passwords, passcodes, or secret messages. In another example, payment credentials may include any suitable information associated with and/or identifying an account (e.g., a payment account and/or payment device associated with the account). Such information may be directly related to the account or may be derived from information related to the account. Examples of account information may include an "account identifier" such as a PAN (primary account number or "account number"), a token, a subtoken, a gift card number or code, a prepaid card number or code, a user name, an expiration date, a CVV (card verification value), a dCVV (dynamic card verification value), a CVV2 (card verification value 2), a CVC3 card verification value, etc. An example of a PAN is a 16-digit number, such as "4147 0900 0000 1234". In some embodiments, credentials may be considered sensitive information.

The term "verification" and its derivatives may include a process that utilizes information to determine whether an underlying subject is valid under a given set of circumstances. Verification may include any comparison of information to ensure some data or information is correct, valid, accurate, legitimate, and/or in good standing.

A "processing network computer" may include a system that can support and deliver data services. A processing network computer can be in a "payment processing network" that may include data processing subsystems, networks, server computers and operations used to support and deliver authorization services, exception file services, and clearing and settlement services. A payment processing network may be any suitable network able to transmit and receive financial system transaction messages (e.g., ISO 8583 messages), and process original credit and debit card transactions. An exemplary payment processing system may include VisaNet™. Payment processing systems such as VisaNet™ are able to process credit card transactions, debit card transactions, and other types of commercial transactions.

A "token" may be a substitute value for a credential. An "access token" may be a token used to access something. A token may be a string of numbers, letters, or any other suitable characters. Examples of access tokens include digital wallet tokens (substituting for a digital wallet credential), virtual payment account numbers (VPANs), personal identification tokens, etc.

A "key pair" may include a pair of linked cryptographic keys. For example, a key pair can include a public key and a corresponding private key. In a key pair, a first key (e.g., a public key) may be used to encrypt a message, while a second key (e.g., a private key) may be used to decrypt the message. Additionally, a public key may be able to verify a digital signature created with the corresponding private key. The public key may be distributed throughout a network in order to allow for verification of messages signed using the corresponding private key. Public and private keys may be in any suitable format, including those based on RSA or elliptic curve cryptography (ECC).

An "ephemeral key" can include a temporary cryptographic key. An ephemeral key can be an ephemeral public key or an ephemeral private key. An ephemeral key can be generated for each execution of a key establishment process. An ephemeral key can be used one or more times in a session.

A "session key" can include a cryptographic key used for encrypting messages in a communication session. In some cases, a session key can be used for encrypting all messages in a single communication session. As an example, a first session key can be derived by a first device using a first device private key and a second device public key. A second session key can be derived by a second device using a second device private key and a first device public key. The first session key and the second session key can be equal to one another and allow the first device and the second device to communication with one another over a secure communication channel. However, it is understood that a session key can be generated in any suitable manner that allows two devices to communicate over a secure communication channel.

A "digital signature" may include any electronic signature for a message. A digital signature may be a numeric data value, an alphanumeric data value, or any other type of data. In some embodiments, a digital signature may be a unique data value generated from a message (or data packet) and a private key using a cryptographic algorithm. In some embodiments, a validation algorithm using a public key may be used to verify the signature. A digital signature may be used to demonstrate the veracity of the sender.

A "communication channel" can include a medium through which message(s) can be provided. A communication channel can include a physical transmission medium (e.g., a wire, a contact interface, etc.), an over-the-air communication medium (e.g., using electromagnetic signals, etc.), a logical medium (e.g., application programming interfaces (APIs), etc.), and/or a combination thereof.

A "frame" may include a unit of data in a data transmission in a computer network. In some embodiments, a "frame" can be any unit of data transmitted in the physical layer or the data link layer in the seven-layer OSI model of computer networking. A frame may comprise a self-contained independent entity of data containing sufficient information to be routed from a source device to a destination device. A frame can be transmitted wirelessly using technologies such as, for example, Wi-Fi™, Bluetooth©, NFC, etc.

A "processor" may include a device that processes something. In some embodiments, a processor can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

Embodiments of the invention relate to the use of a session key generation process to create keys for ultra-wideband communications. The key generation process can also be used to randomly generate ultra-wideband parameters such as a network ID. One advantage of using the session key generation process, as described in further detail herein, for generating ultra-wideband keys and data is that the key generation process is secure and established. Further, embodiments provide for defenses to relay attacks using ultra-wideband communication techniques. However, it is understood that the invention is not limited to using the ultra-wideband communication channel for relay attacks. The ultra-wideband communication channel can be used for any secure communication between two devices.

For example, during interactions between users and resource providers, it is beneficial to verify the location of the user's device and the resource provider's device, for example, using ultra-wideband. However, simply adding ultra-wideband communications between the user's device and the resource provider's device during an interaction can introduce security vulnerabilities into the interaction system.

For example, if the ultra-wideband communication session is separate from the interaction communication session, then it may be possible for a malicious party to mimic the ultra-wideband device of a remote resource provider in the vicinity of the real user's device. After being able to achieve this, the malicious party could then defeat relay protection by convincing the user's device and/or the resource provider's device that they are located several meters apart, when in fact they may be many kilometres apart.

For interactions between users and resource providers, a feature of ultra-wideband that can be leveraged is the accurate, and potentially secure, distance measurement capabilities. This feature can be used to: 1) prove that a user device is present at a resource provider's location during an interaction, and 2) provide strong protection against relay attacks.

Traditionally, relay protection mechanisms have been based on measuring the round-trip time to communicate between two devices. An individual ultra-wideband link is hard to intercept and relay, because of the nature of ultra-wideband radio and the very fine-grained timing (e.g., a nanosecond time resolution that satisfies the requirements for centimeter-precision ranging). The timings are very accurate because they are built in at the lowest low level (e.g., at a physical layer). Current designs for relay protection for interactions rely on timings at the application level, with millisecond granularity, which is far less accurate than ultra-wideband (e.g., light, and radio waves, travel 300 km in 1 ms).

If ultra-wideband distance is to be used by an interaction application for relay protection, then the ultra-wideband session needs to be bound to the application level connection, for both a user device and an access device, operated by the user and the resource provider, respectively. Otherwise, if the ultra-wideband session was separate from the application level connection, it may be possible for a malicious party to mimic the ultra-wideband device of a remote resource provider in the vicinity of the real user device, and vice-versa. If the malicious party is able to achieve this, then the malicious party could defeat the relay protection by convincing the user device or the access device that they are several meters apart, when in fact they may be kilometers apart.

Embodiments provide for systems and methods that link the ultra-wideband communication channel to the secure application level communication channel. For example, a first (e.g., primary) communication channel can be formed between the user device and the access device. The primary communication channel can be a Bluetooth low energy (BLE) communication channel, for example. The user device and the access device can secure the primary communication channel using Diffie-Hellman key exchange, or other suitable process. After securing the primary communication channel, the user device and the access device obtain a session key. For example, the access device can generate the session key using at least a cryptographic key in an access device ephemeral key pair. For example, the access device can generate a session key using at least a private cryptographic key in an access device ephemeral key pair and a public cryptographic key in a user device key pair. An ultra-wideband communication channel can then be secured between the user device and the access device using the session key.

To determine if a user device is present or likely present, embodiments can make use of wireless ranging techniques. Although wireless ranging can be performed with many different wireless technologies (e.g., radar, sonar, etc.), embodiments use ultra-wideband technology and ranging protocols, as defined in IEEE standards 802.15.4 and 802.15.4z. Prior to describing systems and methods according to embodiments, some characteristics of ultra-wideband are described below.

UWB is a wireless communication technology characterized by short-range, high bandwidth communications. Ultra-wideband has good time domain resolution because of its high bandwidth. As a result of this good time domain resolution, ultra-wideband can be used to accurately determine the distance between objects, more accurately than other wireless technologies with lower bandwidth. As an example, some ultra-wideband Doppler radar systems can detect millimeter scale movement of objects at distances of around five meters.

UWB also supports higher pulse repetition frequencies (PRFs) compared to other wireless technologies. Generally, the pulse repetition frequency relates to the rate at which ultra-wideband-capable devices transmit pulses. In one ultra-wideband mode, devices can transmit at a PRF of 128 MHz, using 16 pulses per coded bit and a 4 ns spacing. As a result, the length of ultra-wideband bursts in this mode is approximately 32 ns. In some embodiments the ultra-wideband communication channel can operates at frequencies between 3.1 GHz and 10.6 GHz.

These features make ultra-wideband technology well suited for applications related to securing data using distance measurements, as described herein. The good time domain resolution enables accurate ranging, enabling embodiments to accurately determine whether a mobile device is actually present. Further, the nanosecond scale bursts and high pulse repetition make it difficult for any potential hacker to intercept and modify ultra-wideband frames. A hacker only has tens of nanoseconds to intercept, process, and transmit modified frames. This is a difficult or impossible task for current processing systems.

UWB ranging can be accomplished using techniques similar to those of other radio ranging technologies, e.g., using time of flight (ToF) measurements. Because the speed of light and the velocity factor of most transmission mediums (usually air for ultra-wideband) are known, the distance between two objects can be determined based on the amount of time it takes for one radio pulse to move from one object to the other. Further details on relay attacks and ultra wideband communications can be found in PCT/US2021/040898 filed on Jul. 8, 2021, which is assigned to the same assignee as the present application.

FIG. 1 shows a system 100 according to embodiments of the disclosure. The system 100 comprises a user device 102, an access device 104, a resource provider computer 106, a transport computer 108, a network processing computer 110, and an authorizing entity computer 112. The user device 102 can be in operative communication with the access device 104. The access device 104 can be in operative communication with the resource provider computer 106, which can be in operative communication with the transport computer 108. The transport computer 108 can be in operative communication with the network processing computer 110, which can be in operative communication with the authorizing entity computer 112.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1.

Messages between at least the devices illustrated in FIG. 1 can be transmitted using a secure communications protocols such as, but not limited to, File Transfer Protocol (FTP); HyperText Transfer Protocol (HTTP); Secure Hypertext Transfer Protocol (HTTPS), TLS, ISO (e.g., ISO 8583) and/or the like. The communications network can include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. The communications network can use any suitable communications protocol to generate one or more secure communication channels. A communications channel may, in some instances, comprise a secure communication channel, which may be established in any known manner, such as through the use of mutual authentication and a session key, and establishment of a Transport Layer Security (TLS) session.

The user device 102 can include a device operated by a user. The user device 102, for example, can include a mobile device, a laptop, a card, etc. The user device 102 can be configured to initiate an interaction with the access device 104. The user device 102 can store a user device public key and a user device private key. The user device 102 can also store one or more certificates that indicate the authenticity of the user device public key and the user device private key.

The access device 104 can include a device operated by a resource provider. The access device 104, for example, can include a mobile device, a POS terminal, a laptop, etc.). The access device 104 and the user device 102 can communicate with one another to perform an interaction. The access device 104 can store an access device public key and an access device private key. The access device 104 can also store one or more certificates that indicate the authenticity of the access device public key and the access device private key.

During an interaction, the access device 104 can provide interaction data to the resource provider computer 106 for authorization of the interaction. In some embodiments, the access device 104 can generate an authorization request message comprising at least the interaction data. The access device 104 can provide the authorization request message to the resource provider computer 106.

The resource provider computer 106 can include a computer operated by a resource provider (e.g., a merchant). The resource provider computer 106 can be a desktop computer, a server computer, etc. The resource provider computer 106 can operate in conjunction with the access device 104. In some embodiments, the resource provider computer 106 can generate authorization request messages for interactions between the user device 102 and the access device 104. The resource provider computer 106 can provide the authorization request messages to the transport computer 108.

The transport computer 108 be located between (in an operational sense) the resource provider computer 106 and the network processing computer 110. The transport computer 108 may be operated by an entity such as an acquirer. An acquirer can maintain an account of any merchants with which users may wish to interact.

The network processing computer 110 may route or switch messages between a number of transport computers including the transport computer 108, and a number of authorizing entity computers including the authorizing entity computer 112. The network computer may be a processing network computer in some embodiments. The processing network computer may be configured to provide authorization services, and clearing and settlement services for payment transactions. A processing network computer may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular includes a Visa Integrated Payments (VIP) system which processes authorization requests and a Base II system which performs clearing and settlement services. Furthermore, the payment processing network may include a server computer and may use any suitable wired or wireless telecommunications network, including the Internet. In some embodiments, the processing network computer may forward an authorization request received from a transport computer to the authorizing entity computer via a communication channel. The processing network computer may further forward an authorization response message received from the authorizing entity computer to the transport computer.

The authorizing entity computer 112 may be configured to authorize any suitable request, including access to data, access to a location, or approval for a payment. In some embodiments, the authorizing entity computer 112 may be operated by an account issuer. Typically, the issuer is an entity (e.g., a bank) that issues and maintains an account of a user. The account may be a credit, debit, prepaid, or any other type of account.

As an illustrative example of an interaction processing method, the user of the user device may conduct a transaction at the resource provider (e.g., a merchant) using the user device 102. The transaction may be a payment transaction (e.g., for the purchase of a good or service), an access transaction (e.g., for access to a transit system), or any other suitable transaction. The user device 102 can interact with an access device 104 at a resource provider associated with resource provider computer 106. For example, the user may tap the user device 102 against an NFC reader in the access device 104. Alternately, the user may indicate payment account information to the resource provider electronically, such as in an online transaction. In some cases, the user device 102 may transmit to the access device 104 an account identifier, such as a payment token.

In order to authorize a transaction, an authorization request message may be generated by the access device 104 or the resource provider computer 106 and then forwarded to the transport computer 108. After receiving the authorization request message, the authorization request message is then sent to the network processing computer 110. The network processing computer 110 then forwards the authorization request message to the corresponding authorizing entity computer 112 associated with an authorizing entity associated with the user's payment account.

After the authorizing entity computer 112 receives the authorization request message, the authorizing entity computer 112 sends an authorization response message back to the network processing computer 110 to indicate whether the current transaction is authorized (or not authorized). The network processing computer 110 then forwards the authorization response message back to the transport computer 108. In some embodiments, network processing computer 110 may decline the transaction even if the authorizing entity computer 112 has authorized the transaction, for example depending on a value of the fraud risk score. The transport computer 108 then sends the response message back to the resource provider computer 106.

After the resource provider computer 106 receives the authorization response message, the resource provider computer 106 may then provide the authorization response message for the user. The response message may be displayed by the access device 104, or may be printed out on a physical receipt. Alternately, if the transaction is an online transaction, the resource provider may provide a web page or other indication of the authorization response message as a virtual receipt. The receipts may include transaction data for the transaction.

At the end of the day, a normal clearing and settlement process can be conducted by the network processing computer 110. A clearing process is a process of exchanging financial details between an acquirer and an authorizing entity to facilitate posting to a user's payment account and reconciliation of the user's settlement position.

Figure 2A:
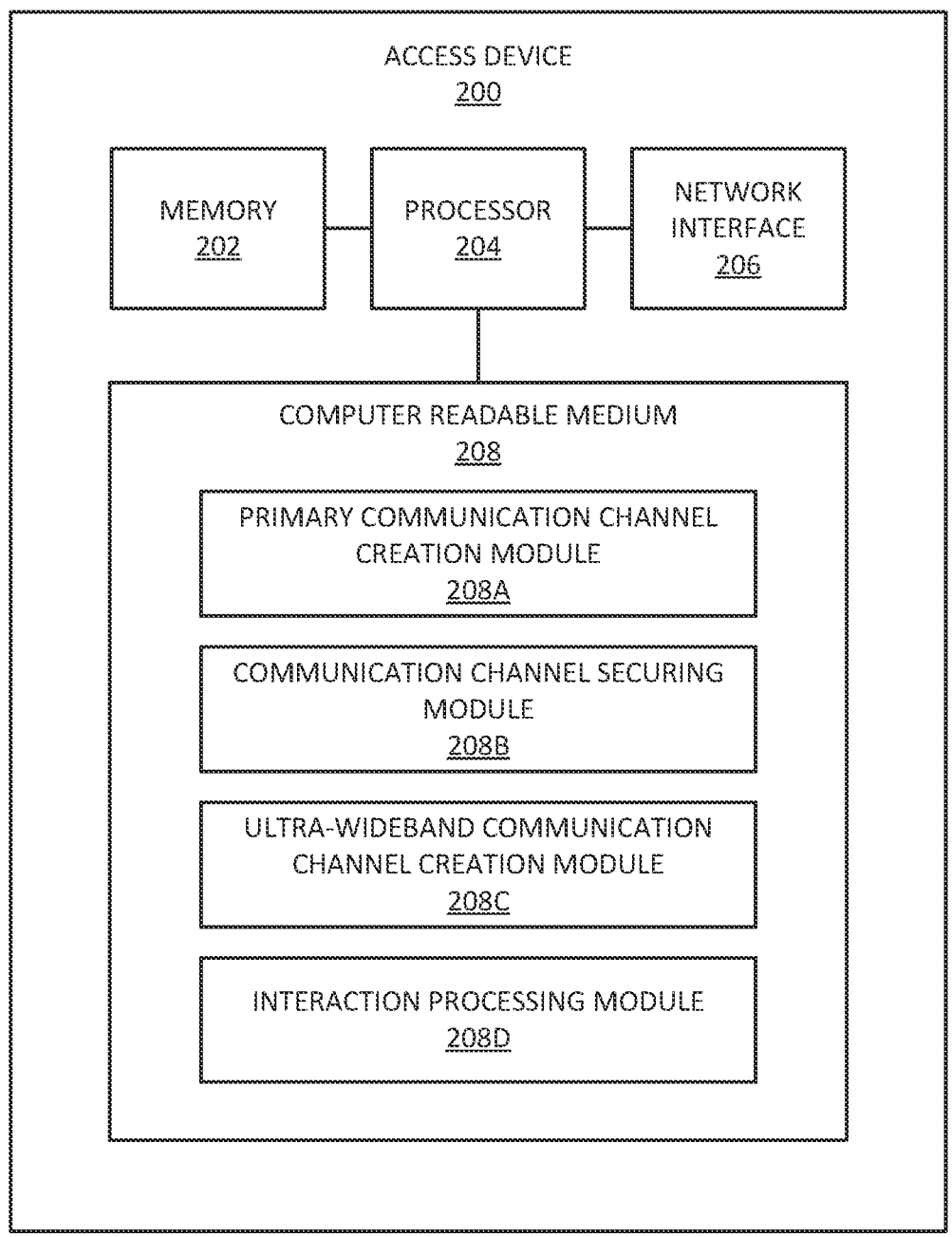
FIG. 2A shows a block diagram of components of an access device according to embodiments.

FIG. 2A shows a block diagram of an access device 200 according to embodiments. The exemplary access device 200 may comprise a processor 204. The processor 204 may be coupled to a memory 202, a network interface 206, and a computer readable medium 208. Other input and output elements such as keyboard, speakers and displays may also be in the access device 200. The computer readable medium 208 can comprise a primary communication channel creation module 208A, a communication channel securing module 208B, a ultra-wideband communication channel creation module 208C, and an interaction processing module 208D.

The memory 202 can be used to store data and code. For example, the memory 202 can store public/private key pairs, certificates, etc. The memory 202 may be coupled to the processor 204 internally or externally (e.g., cloud based data storage), and may comprise any combination of volatile and/or non-volatile memory, such as RAM, DRAM, ROM, flash, or any other suitable memory device.

The computer readable medium 208 may comprise code, executable by the processor 204, for performing a method comprising: forming a communication channel between a user device and an access device; securing the communication channel between the user device and the access device using a user device key pair in the user device and an access device ephemeral key pair in the access device; generating, by the access device, a session key using at least a private cryptographic key in the access device ephemeral key pair and a public cryptographic key in the user device key pair; and using, by the access device, the session key to secure an ultra-wideband communication channel between the user device and the access device.

The primary communication channel creation module 208A may comprise code or software, executable by the processor 204, for establishing a primary communication channel. The primary communication channel creation module 208A, in conjunction with the processor 204, can establish a communication channel with another device. For example, the primary communication channel creation module 208A, in conjunction with the processor 204, can establish a communication channel with a user device. The primary communication channel creation module 208A, in conjunction with the processor 204, can establish any suitable communication channel including, but not limited to, a Bluetooth communication channel, a Bluetooth low energy (BLE) communication channel, a near-field communication (NFC) channel, etc. In some embodiments, the primary communication channel can be an over-the-air communication channel.

The communication channel securing module 208B may comprise code or software, executable by the processor 204, for securing a communication channel. The communication channel securing module 208B, in conjunction with the processor 204, can secure a communication channel established by the primary communication channel creation module 208A, in conjunction with the processor 204. The communication channel securing module 208B, in conjunction with the processor 204, can communicate with another device (e.g., a user device) over the primary communication channel to secure the primary communication channel. For example, the communication channel securing module 208B, in conjunction with the processor 204, can perform a secure channel establishment and validation process.

In some embodiments, the communication channel securing module 208B, in conjunction with the processor 204, can secure the communication channel between the user device and the access device 200 using a user device public key of a user device key pair in the user device and an access device ephemeral private key of an access device ephemeral key pair in the access device 200. For example, the communication channel securing module 208B, in conjunction with the processor 204, can generate a primary communication channel session key using a received user device public key and the access device ephemeral private key (which can be generated by the access device 200). The primary communication channel session key can be utilized to encrypt messages that are to be sent to the user device, where the user device can decrypt the messages using the same primary communication channel session key that is derived by the user device based on the user device private key and the access device ephemeral public key.

The ultra-wideband communication channel creation module 208C can include code or software, executable by the processor 204, for establishing an ultra-wideband communication channel. The ultra-wideband communication channel creation module 208C, in conjunction with the processor 204, can establish an ultra-wideband communication channel with a user device. The ultra-wideband communication channel creation module 208C, in conjunction with the processor 204, can establish an ultra-wideband communication channel between two devices, as known to one of skill in the art. In some embodiments, the ultra-wideband communication channel creation module 208C, in conjunction with the processor 204, can establish a communication channel that operates in a frequency band from 3.1 GHz to 10.6 GHz.

The interaction processing module 208D can comprise code or software, executable by the processor 204, for processing interactions. The interaction processing module 208D, in conjunction with the processor 204, can process interaction data received from a user device. For example, the interaction processing module 208D, in conjunction with the processor 204, can receive and/or otherwise obtain interaction data including an amount, a user credential, a user token, a date, a time, and/or any combination thereof. The interaction processing module 208D, in conjunction with the processor 204, can generate an authorization request message comprising the amount, the user credential, the user token, the date, the time, and/or any combination thereof. The authorization request message can be provided to a resource provider computer, which can provide the authorization request message to an authorizing entity computer of authorization of the interaction between the user device and the access device 200.

The network interface 206 may include an interface that can allow the access device 200 to communicate with external computers. The network interface 206 may enable the access device 200 to communicate data to and from another device (e.g., a user device, a resource provider computer, a transport computer, etc.). Some examples of the network interface 206 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 206 may include Wi-Fi™. Data transferred via the network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 206 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

Figure 2B:
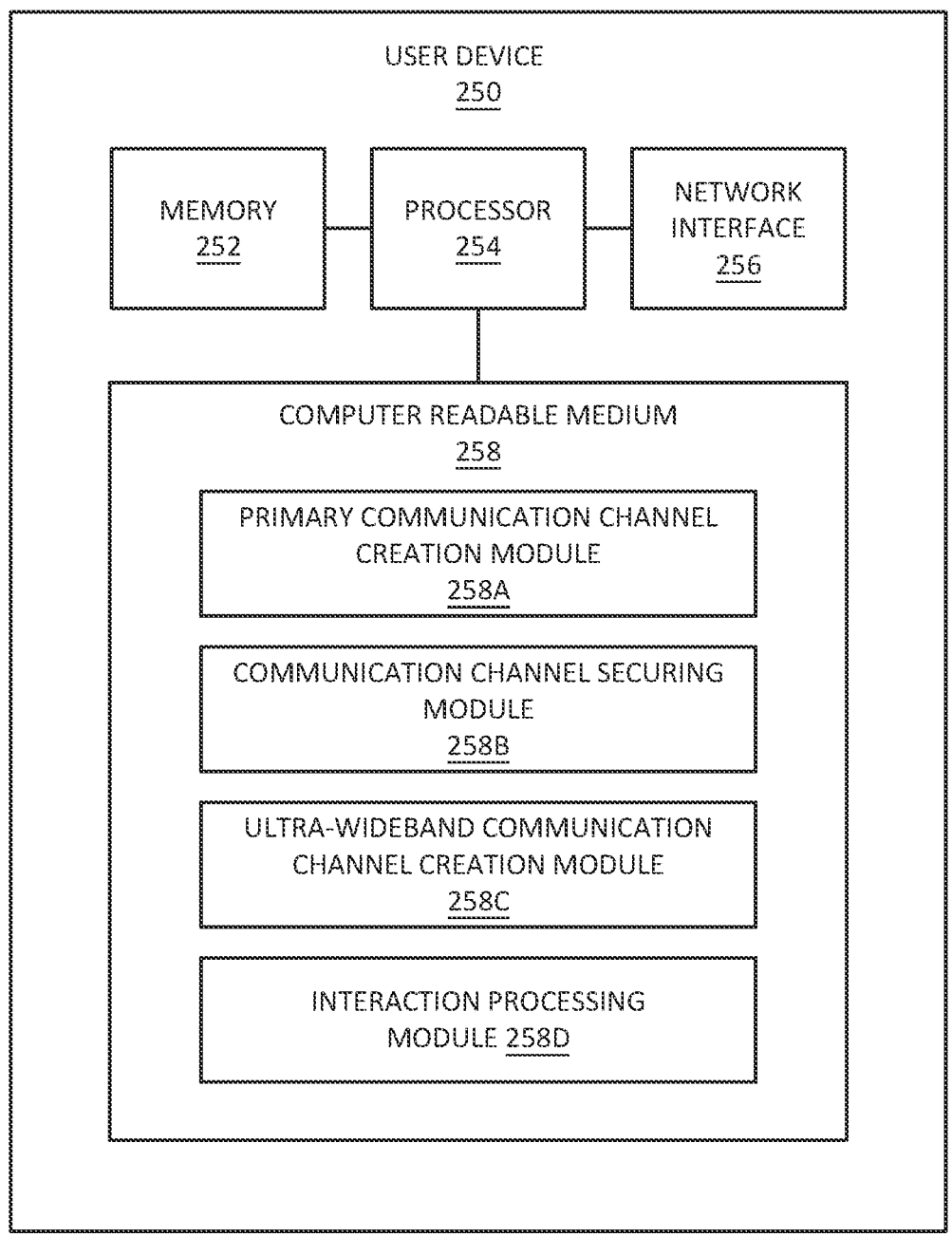
FIG. 2B shows a block diagram of components of a user device according to embodiments.

FIG. 2B shows a block diagram of a user device 250 according to embodiments. The exemplary user device 250 may comprise a processor 254. The processor 254 may be coupled to a memory 252, a network interface 256, and a computer readable medium 258. Other input and output elements such as keyboard, speakers and displays may also be in the user device 250. The computer readable medium 258 can comprise a primary communication channel creation module 258A, a communication channel securing module 258B, a ultra-wideband communication channel creation module 258C, and an interaction processing module 258D.

The memory 252 can be used to store data and code. For example, the memory 252 can store public/private key pairs, certificates, etc. The memory 252 may be coupled to the processor 254 internally or externally (e.g., cloud based data storage), and may comprise any combination of volatile and/or non-volatile memory, such as RAM, DRAM, ROM, flash, or any other suitable memory device.

The computer readable medium 258 may comprise code, executable by the processor 254, for performing a method comprising: forming a communication channel between a user device and an access device; securing the communication channel between the user device and the access device using a user device key pair in the user device and an access device ephemeral key pair in the access device; generating, by the user device, a session key using at least a private cryptographic key in the user device key pair and a public cryptographic key in the ephemeral key pair; and using, by the user device, the session key to secure an ultra-wideband communication channel between the user device and the access device.

The primary communication channel creation module 258A of the user device 250 can be similar to the primary communication channel creation module 208A of the access device 200 as illustrated in FIG. 2A. For example, the primary communication channel creation module 208A can comprise code or software, executable by the processor 254, for establishing a primary communication channel. The primary communication channel creation module 258A, in conjunction with the processor 254, can establish a communication channel with another device, such as an access device. The primary communication channel creation module 258A, in conjunction with the processor 254, can establish any suitable communication channel including, but not limited to, a Bluetooth communication channel, a Bluetooth low energy (BLE) communication channel, a near-field communication (NFC) channel, etc. In some embodiments, the primary communication channel can be an over-the-air communication channel.

The communication channel securing module 258B of the user device 250 can be similar to the communication channel securing module 208B of the access device 200 as illustrated in FIG. 2A. For example, the communication channel securing module 258B can comprise code or software, executable by the processor 254, for securing a communication channel. The communication channel securing module 258B, in conjunction with the processor 254, can secure a communication channel established by the primary communication channel creation module 258A, in conjunction with the processor 254. The communication channel securing module 258B, in conjunction with the processor 254, can communicate with another device (e.g., an access device) over the primary communication channel to secure the primary communication channel. For example, the communication channel securing module 258B, in conjunction with the processor 254, can perform a secure channel establishment and validation process.

In some embodiments, the communication channel securing module 258B, in conjunction with the processor 254, can secure the communication channel between the user device 250 and an access device using an access device ephemeral public key of an access device ephemeral key pair in the access device and a user device private key of a user device key pair in the user device 250. For example, the communication channel securing module 258B, in conjunction with the processor 254, can generate a primary communication channel session key using a received access device ephemeral public key and the user device private key (which can be provisioned to or created by the access device 250). The primary communication channel session key can be utilized to encrypt messages that are to be sent to the access device, where the access device can decrypt the messages using the same primary communication channel session key that is derived by the access device based on the access device ephemeral private key and the user device public key.

The ultra-wideband communication channel creation module 258C of the user device 250 can be similar to the ultra-wideband communication channel creation module 208C of the access device 200 as illustrated in FIG. 2A. For example, the ultra-wideband communication channel creation module 258C can include code or software, executable by the processor 254, for establishing an ultra-wideband communication channel. The ultra-wideband communication channel creation module 258C, in conjunction with the processor 254, can establish an ultra-wideband communication channel with an access device. The ultra-wideband communication channel creation module 258C, in conjunction with the processor 254, can establish an ultra-wideband communication channel between two devices, as known to one of skill in the art. In some embodiments, the ultra-wideband communication channel creation module 258C, in conjunction with the processor 254, can establish a communication channel that operates in a frequency band from 3.1 GHz to 10.6 GHz.

The interaction processing module 208D of the user device 250 can be similar to the interaction processing module 258D of the access device 200 as illustrated in FIG. 2A. For example, the interaction processing module 258D can comprise code or software, executable by the processor 254, for processing interactions. The interaction processing module 258D, in conjunction with the processor 254, can process interaction data that is to be sent to an access device. For example, the interaction processing module 258D, in conjunction with the processor 254, can generate and/or otherwise obtain interaction data including an amount, a user credential, a user token, a date, a time, and/or any combination thereof. The interaction processing module 258D, in conjunction with the processor 254, can provide the interaction data to an access device via, for example, a secured primary communication channel.

The network interface 256 may include an interface that can allow the user device 250 to communicate with external computers. The network interface 256 may enable the user device 250 to communicate data to and from another device (e.g., a access device, another user device, etc.). Some examples of the network interface 256 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 256 may include Wi-Fi™. Data transferred via the network interface 256 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 256 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

Figure 3:
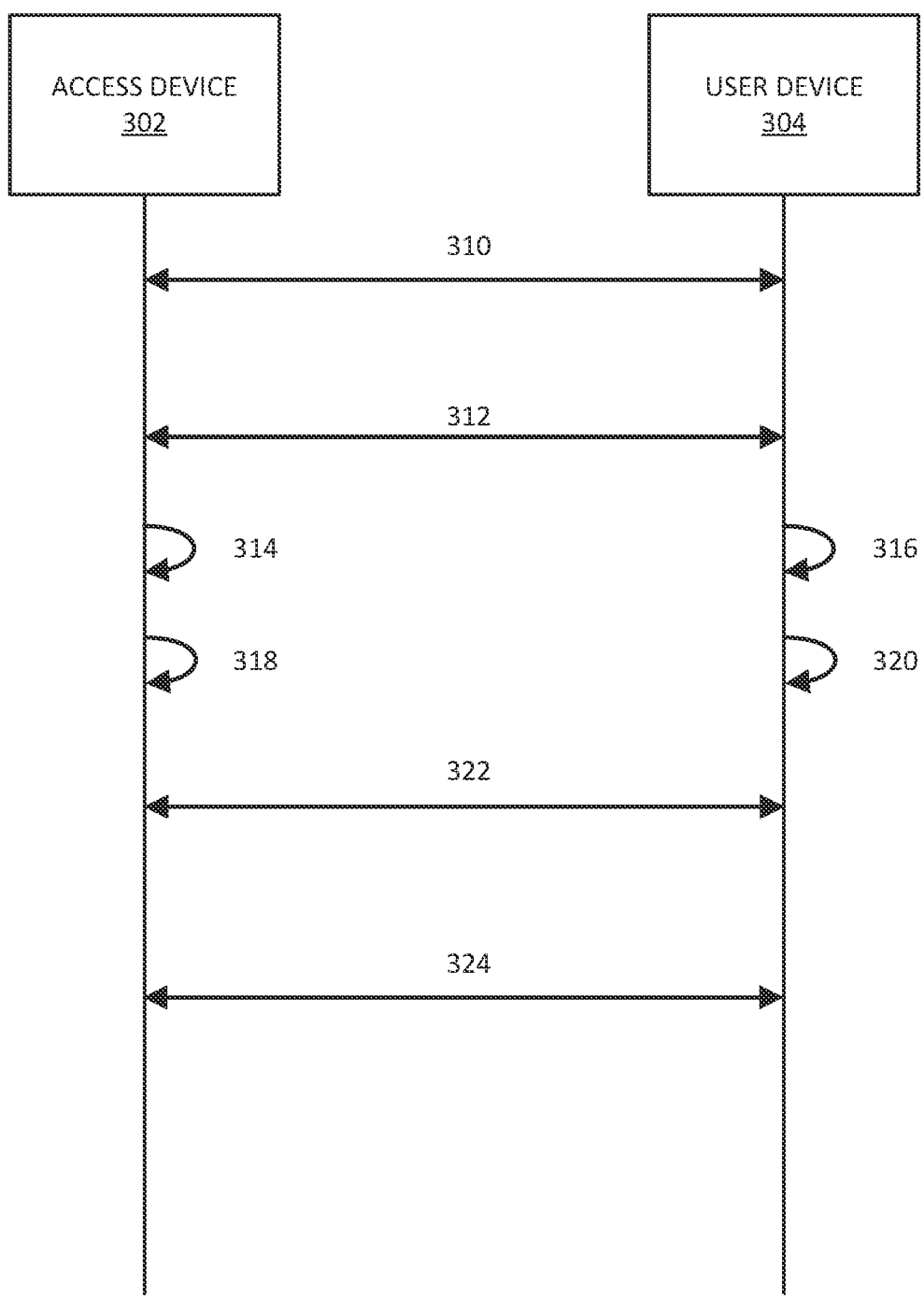
FIG. 3 shows a flow diagram illustrating a first secure communication channel creation process according to embodiments.

FIG. 3 shows a flow diagram illustrating a first secure communication channel creation process according to embodiments. The method illustrated in FIG. 3 will be described in the context of a user device establishing an ultra-wideband communication channel with an access device. In particular, the method described with reference to FIG. 3 will provide for establishing a validated secure channel using a primary communications protocol and allow an access device 302 and a user device 304 to interact using a secured ultra-wideband communication channel. It is understood, however, that the invention can be applied to other circumstances.

Prior to step 310, the user device 304 can be provided with certificates (e.g., elliptic curve cryptographic (ECC) certificates) and a user device private/public key pair (e.g., ECC keys). The user device 304 can be provisioned with the certificates and the user device private/public key pair in a secure manner from an issuer, certificate authority, and/or other provisioning server computer. For example, the user device 304 can store a user device certificate that indicates the authenticity, as verified by a certificate authority, of the user device public key.

The access device 302 can be provided with one or more certificate authority public keys from one or more certificate authorities. The one or more certificate authority public keys can be ECC certificate authority public keys. For example, the access device 302 can store an access device certificate that indicates the authenticity of the access device public key.

In some embodiments, a user of the user device 304 and a resource provider of the access device 302 can initiate an interaction for one or more resources.

At step 310, the user device 304 and the access device 302 can form a primary communication channel. For example, the user device 304 and the access device 302 can form a close-range communication channel. The close-range communication channel can include a Bluetooth communication channel, a Bluetooth low energy (BLE) communication channel, a near-field communication (NFC) channel, etc. The primary communication channel can be established in any suitable manner dependent on the type of communication channel.

As an illustrative example, if the communication channel is a Bluetooth communication channel, and if the user device and the access device know nothing about each other, then one of the devices can run an inquiry to try to discover the other device. For example, one device sends out the inquiry request, and any device listening for such a request will respond with an address, a name, and/or other information. The inquiry device can also share its address with the other device. The two devices can then perform a connection process that includes forming a connection between two devices using the address.

At step 312, after forming the primary communication channel, the user device 304 and the access device 302 can secure the primary communication channel. The primary communication channel can be secured at an application level (e.g., while communicating using an interaction application on the user device 304 and the access device 302, rather than at a hardware level). For example, the user device 304 and the access device 302 can secure the primary communication channel using the user device key pair from the user device 304 and an access device ephemeral key pair from the access device 302. The user device key pair and the access device ephemeral key pair can both be ECC key pairs.

In particular, the user device 304 can provide a user device public key of the user device key pair to the access device 302. In some embodiments, the user device 304 can also provide the user device certificate that is signed by the certificate authority to the access device 302.

In some embodiments, the access device 302 can pre-generate the access device ephemeral key pair in any suitable cryptographic key generation process, as known to one of skill in the art. For example, an ephemeral key pair can be a one-time use or a limited time use public/private cryptographic key pair. The access device ephemeral key pair can be generated during an elliptic-curve cryptography key generation process. An ephemeral private key can be generated in a similar manner to generating a private key. Similarly, an ephemeral public key can be generated in a similar manner to generating a public key.

Upon receiving the user device public key, and optionally the user device certificate, the access device 302 can generate a shared secret using the user device public key and an access device ephemeral private key of the access device ephemeral key pair. For example, the shared secret can be generated using a Diffie-Hellman elliptic curve cryptographic technique, as known to one of skill in the art. In some embodiments, if the access device 302 receives the user device certificate, then the access device 302 can verify the user device certificate. In particular, the access device 302 can verify the signature (e.g., a digital signature) created by the certificate authority on the user device certificate using a certificate authority public key that is made publicly available by the certificate authority.

Prior to receiving the user device public key or after generating the shared secret, the access device 302 can provide an access device ephemeral public key of the access device ephemeral key pair to the user device 304. In some embodiments, the access device 302 can also provide an access device certificate that is signed by the certificate authority to the user device 304.

Upon receiving the access device public key, and optionally the access device certificate, the user device 304 can generate a shared secret using the access device ephemeral public key and a user device private key of the user device key pair. For example, the shared secret can be generated using a Diffie-Hellman elliptic curve cryptographic technique, using the same process that the access device 302 used to generate the shared secret. In some embodiments, if the user device 304 receives the access device certificate, then the user device 304 can verify the access device certificate. In particular, the user device 304 can verify the signature created by the certificate authority on the access device certificate using a certificate authority public key that is made publicly available by the certificate authority.

The shared secrets held by both the access device 302 and the user device 304 can be the same shared secret and can be utilized by the access device 302 and the user device 304 as a symmetric key to secure the primary communication channel. For example, further communications over the primary communication channel can be encrypted and decrypted with the shared secret.

The shared secret, when used to securely communicate over a secured communication channel, can be considered to be a session key. In particular, the shared secret can be considered to be a first session key.

In some embodiments, the access device 302 and the user device can generate more than one session key that includes, for example, the first session key and a second session key. The first session key can be the shared secret that is used to secure the primary communication channel as described above. The second session key can be utilized by the access device 302 and the user device 304 to establish ultra-wideband credentials. In some embodiments, additional session keys can be generated and can then be used to create or be used as cryptographic keys for scrambled time stamp security, secure ranging, etc.

At step 314 and step 316, after securing the primary communication channel, the access device 302 and the user device 304 can respectively establish ultra-wideband credentials.

In particular, at step 314, the access device 302 can generate an ultra-wideband credential. The ultra-wideband credential can include a network identifier. The network identifier can be an ultra-wideband network identifier (e.g., a 2-byte identifier). In some embodiments, the ultra-wideband credential can also include scrambled time stamp credentials (e.g., one of the additional session keys can be used as an AES cryptographic key for scrambled time stamp generation). In other embodiments, the ultra-wideband credential can also include one or more secure ranging credentials (e.g., one of the additional session keys can be used as an AES cryptographic key for secure ranging communications).

The access device 302 can generate the ultra-wideband credential based on a previously generated session key. For example, the access device 302 can generate the ultra-wideband credential based on the first session key or the second session key. The ultra-wideband credential can be derived from the session key. For example, the ultra-wideband credential can be formed from hashing the session key into a 2-byte value, formed from the first 4 bytes of the session key, formed from the last 4 bytes of the session key, or any other suitable process that obtains a value to be used as an ultra-wideband credential from a session key.

At step 316, the user device 304 can generate an ultra-wideband credential using the same process that the access device 302 used to generate an ultra-wideband credential. For example, the user device 304 can generate the ultra-wideband credential based on a previously generated session key. For example, the user device 304 can generate the ultra-wideband credential based on the first session key or the second session key. The ultra-wideband credential derived by the user device 304 can be the same ultra-wideband credential derived by the access device 302.

At steps 318 and 320, the access device 302 and the user device 304 can establish a secure ultra-wideband communication channel.

In particular, at step 318, after establishing the ultra-wideband credential, the access device 302 can initialize an ultra-wideband anchor process, where the access device 302 acts as an anchor during communications with the user device 304 to form an ultra-wideband communication channel. The access device 302 and the user device 304 can communicate using the ultra-wideband credentials so that the ultra-wideband communication channel is a secure ultra-wideband communication channel.

As an example, the access device 302 can begin listening for incoming messages from the user device 304 over the ultra-wideband communication channel using the ultra-wideband credential. In particular, the ultra-wideband credential includes a network identifier that both the access device 302 and the user device 304 will utilize for communications. The access device 302 can listen for broadcasts from other devices, but may only process and respond to messages that are received from another device (e.g., the user device 304) that utilize the same network identifier.

At step 320, after establishing the ultra-wideband credential, the user device 304 can initialize an ultra-wideband tag process, where the user device 304 acts as a tag during communications with the access device 302 to form the ultra-wideband communication channel. The tag (e.g., the user device 304) can determine a distance to the anchor (e.g., the access device 302) by measuring the round-trip time.

As an example, the user device 304 can generate a first ultra-wideband communication channel message to establish communication with the access device 302. The user device 304 can provide the first ultra-wideband communication channel message to the access device 302 to establish the ultra-wideband communication channel. The ultra-wideband communication channel can be secured if the user device 304 and the access device 302 utilize the ultra-wideband credentials during communications.

In some embodiments, at step 322, one of the previously generated session keys can be used in a scrambled time-stamp, secure ranging, or pulse reordering security process to further secure the ultra-wideband communication and/or determine distances between the access device 302 and user device 304.

The ultra-wideband communication channel can used in a relay attack prevention process. The relay attack prevention process can include determining a distance between the user device and the access device.

The method illustrated in FIG. 3 shows the user device 304 acting as an ultra-wideband tag, and the access device 302 acting as an ultra-wideband anchor. However, it is understood that both the user device 304 and the access device 302 can operate as both tag and anchor, such that they could each measure a distance to the other device and, in some cases compare the distances. This comparison could be used as part of relay protection, for example.

As an illustrative example, the access device 302 can determine a distance between the access device 302 and the user device 304 using the ultra-wideband communication channel. The access device 302 can compare the distance and a predetermined threshold distance. For example, the access device 302 can determine the distance between the access device 302 and the user device 304 to be 10 centimeters using an ultra-wideband ranging process. The access device 302 can compare the distance of 10 centimeters to the predetermined threshold distance, which can be 40 centimeters. Since the actual distance is less than the threshold distance in this example, a relay attack is not occurring in this example.

In some embodiments, the user device 304 can determine the distance between the access device 302 and the user device 304 using the ultra-wideband communication channel. The user device 304 can determine the distance in a similar manner to how the access device 302 can determine the distance.

In some embodiments, the maximum allowable range (e.g., predetermined threshold distance) can be constrained by a user device application of the user device 304, a resource provider application of the access device 302, the resource provider (e.g., a resource provider operating with limited physical space could limit communication range to less than five meters), etc.

In an illustrative example, the access device 302 can transmit a frame to the user device 304. When the user device 304 receives the frame, the user device 304 can process or interpret the frame, then transmit a response frame back to the access device 302. The response frame can include or otherwise communicate a processing delay $t_{process}$, corresponding to the amount of time between when the user device 304 received the frame and when the user device 304 transmitted the response frame.

Using the processing delay $t_{process}$ and the total time $t_{total}$ between when the access device 302 transmitted the frame to the user device 304 and when the access device 302 received the response frame, the access device 302 can determine the time of flight $t_{flight}$. Because a pulse travels from the access device 302 to the user device 304, and another pulse travels from the user device 304 to the access device 302, the difference between $t_{total}$ and $t_{process}$ is equal to twice the time of flight $t_{flight}$, and thus the time of flight can be determined using the following equation $t_{flight}=0.5(t_{total}-t_{process})$. The access device 302 can transmit another frame to the user device 304 with its own processing delay, thereby enabling the user device 304 to also calculate $t_{flight}$.

Both devices can then use the time of flight to calculate the distance between the access device 302 and the user device 304 using, for example, $d=vf \cdot c \cdot t_{flight}$, where d is the distance, vf is the velocity factor and c is the speed of light in a vacuum. There are a number of variations on this technique that may become apparent to one skilled in the art. For example, timestamps could be used in place of delay values, multiple times of flight could be calculated and averaged, and/or additional terms could be introduced to improve accuracy or otherwise compensate for any issues that might be caused by the radio transmission environment (e.g., multipath interference).

At step 324, the user device 304 and the access device 302 can perform further communications using the secured primary communication channel and/or the secured ultra-wideband communication channel.

For example, the user device 304 and the access device 302 can exchange interaction data using the primary communications channel. In some embodiments, the user device 304 and the access device 302 can utilize the distance determinations from step 322 to determine whether or not to exchange interaction data. For example, if the distance does not exceed the predetermined threshold distance (e.g., the user device 304 and the access device 302 are within the maximum allowable range of one another), the access device 302 can perform an interaction process to obtain interaction data from the user device 304 for an interaction between a user of the user device and a resource provider of the access device 302.

The user device 304 can provide interaction data including, for example, a user device credential to the access device 302. The access device 302 can generate an authorization request message comprising at least the interaction data. After generating the authorization request message, the access device 302 can provide the authorization request message to an authorizing entity computer for authorization via a resource provider computer.

By performing the secure ranging process at step 322, prior to the interaction processing, relay attacks can be mitigated. For example, the secure ranging process can prove that the user device 304 is in vicinity of the access device 302. While this does not explicitly authenticate the access device 302, it prevents the user device 304 from interacting with any access device outside ultra-wideband range.

In particular, the method illustrated in FIG. 3 proves that the user device 304 is in vicinity of the access device 302, because: 1) only a genuine user device can establish the user device-end of the secure channel, 2) the ultra-wideband credentials originated either as part of secure channel establishment or were received by the merchant device via the validated secure channel. In both cases, validation of the secure channel provides assurance that the user device is genuine, 3) successful ultra-wideband ranging can only be performed between devices in ultra-wideband range, that share the keys utilized for scrambled time stamp (STS), secure ranging, and/or pulse reordering, and 4) only the genuine user device can provide interaction data through the secure channel.

Figure 4:
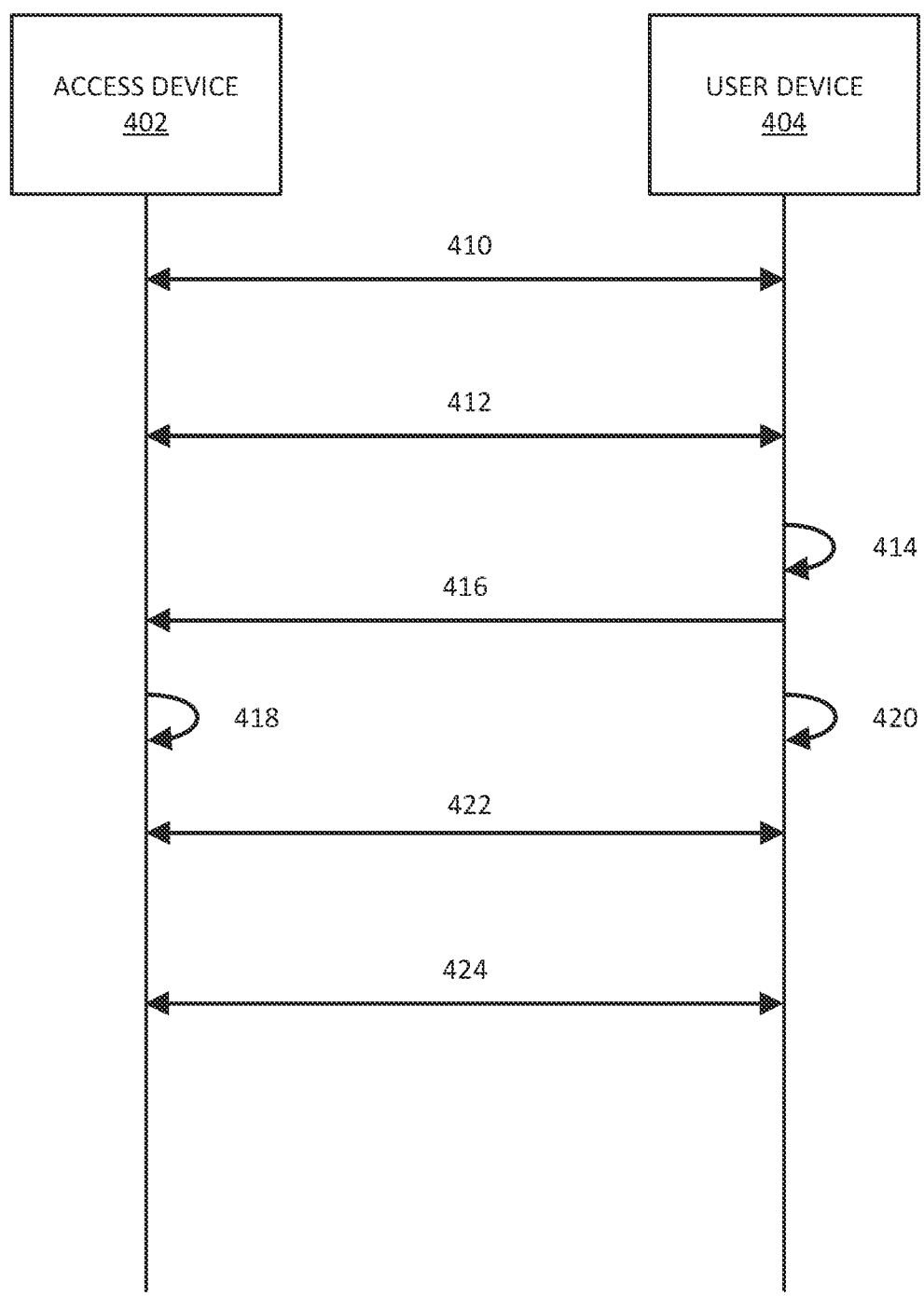
FIG. 4 shows a flow diagram illustrating a second secure communication channel creation process according to embodiments.

FIG. 4 shows a flow diagram illustrating a first secure communication channel creation process according to embodiments. The method illustrated in FIG. 4 will be described in the context of a user device 404 establishing an ultra-wideband communication channel with an access device 402 for secure device ranging verification. It is understood, however, that the invention can be applied to other circumstances.

FIG. 4 illustrates a second mechanism in which secure and accurate relay protection could be provided.

Steps 410-412 of FIG. 4 are similar to steps 310-312 of FIG. 3 and will not be repeated here.

At step 414, after establishing a secure primary communication channel between the access device 402 and the user device 404, the user device 404 can generate an ultra-wideband credential. The user device 404 can generate ultra-wideband credentials as described herein. For example, the user device 404 can generate a random set of ultra-wideband credentials that include an ultra-wideband network identifier, and optionally a scrambled timestamp credential (e.g., cryptographic key) and/or a secure ranging credential (e.g., a cryptographic key).

At step 416, after generating the ultra-wideband credential, the user device 404 can provide the ultra-wideband credential to the access device 402 over the secure primary communication channel. As such, the ultra-wideband credentials can be securely provisioned to the access device 402 from the user device 404.

At step 418, after receiving the ultra-wideband credential from the user device 404, the access device 402 can start an ultra-wideband communication channel as an anchor. While, at step 420, the user device 404 can start the ultra-wideband communication channel as a tag. Steps 418 and 420 can occur at the same time or in any order, such that the access device 402 and the user device 404 establish a secure ultra-wideband communication channel using the ultra-wideband credentials.

Steps 422 and 424 of FIG. 4 are similar to steps 322 and 324 of FIG. 3 and will not be repeated here.

Using either of the methods illustrated in FIGS. 3-4, embodiments can allow a device to establish a secure ultra-wideband communication channel without prior knowledge of the other device.

Further, embodiments provide for relay attack mitigation during interactions. For example, a fraudster could masquerade as an access device and obtain the ultra-wideband credentials that enable them to perform the access device end of the ultra-wideband session. The fraudster could also obtain interaction data from the user device.

However, since the fraudster would not be able to masquerade as a genuine user device (e.g., because they do not have a genuine ECC private key and ECC certificates), they would not be able to perform the user device-end of a secure channel, in order to establish a secure channel with a remote access device to perform a fraudulent interaction using the interaction data obtained from the user device. Consequently, they would not be able to fraudulently pass the interaction data on to the remote access device. As such, the fraudster could capture interaction data, but they could not use the captured interaction data for a real interaction with a real access device.

Some embodiments can utilize a scrambled time stamp (STS). The scrambled time stamp is an enhancement to ultra-wideband communications. For example, a first device (e.g., an access device, user device, etc.) can send, to another device, a set of parameters (e.g., a seed, etc.) that are used to initiate a pseudo-random number generator. This enables each device to generate the same pseudo-random stream of digits. The pseudo-random digits are used sequentially in each protocol packet. The scrambled timestamp sequence can be in the HRP PPDU format. In some embodiments, the STS can change for every frame according to a key (e.g., AES key) and a seed (e.g., 256 bits).

Some embodiments can utilize secure ranging. A secure ranging method can use AES in CCM mode. The AES key can be shared from a higher layer (e.g., an application such as an interaction application). Secure ranging can be formed with one way authentication or with mutual authentication.

For one way authentication, a first device (the verifier), which can be either the user device or the access device, generates an authentication challenge and provides the authentication challenge to a second device. The second device, upon receiving the authentication challenge, can generate a message integrity code (MIC) over the authentication challenge, as known to one of skill in the art. The second device can provide the message integrity code to the first device in response to the authentication challenge. The first device can receive the message integrity code from the user device, then verify the message integrity code.

In some embodiments, the authentication challenge can first be encrypted using a session key. For example, the first device can encrypt the authentication challenge using the session key. The first device can then provide the encrypted authentication challenge to the second device. The second device can then decrypt the authentication challenge using the session key held by the second device to obtain the authentication challenge. Furthermore, in some embodiments, the second device can encrypt the message integrity code using the authentication. The second device can then provide the encrypted message integrity code to the first device, where the first device can decrypt the encrypted message integrity code to obtain the message integrity code.

For mutual authentication, both the first device and the second device can generate a message integrity code, provide the message integrity code to the other device, and verify the received message integrity code to authenticate the other device.

Some embodiments can utilize pulse reordering. Using pulse reordering, the modulation of each bit of a message is modified by using a pseudo-random sequence that is known to only the genuine sender and receiver. For example, the access device and the user device can communicate using the secure primary communication channel to exchange a starting point (e.g., a seed) for a pseudo-random sequence that is stored by both the user device and the access device. During future communications over the ultra-wideband communication channel, the user device and the access device can modify the modulation of each bit of each message using the next value in the pseudo-random sequence such that the other device can still read the messages having known the starting point.

Some embodiments can utilize angle measurement between the user device and the access device. In addition to providing accurate distance measurement, ultra-wideband can also accurately measure the angle between devices. There are two modes of ultra-wideband that are used to determine angle: 1) TDOA (Time Difference of Arrival) and 2) PDOA (Phase Difference of Arrival).

For the TDOA mode, the ultra-wideband anchors are fixed in known locations (e.g., the access device can be in a static location at a resource provider location). The ultra-wideband tags (e.g., the user devices) can remain mobile. The distance and angles are determined by calculating the time taken to communicate with each of the fixed anchors. One ultra-wideband device can have more than one antenna, and can measure the phase difference between signals received from the other device.

For PDOA, both the anchor and the tag can be mobile, since PDOA measures relative distance and angle between the devices (e.g., the anchors don't need to be fixed as for TDOA). The tag can have more than one antenna, and knows the precise position of the antennas, so the tag can perform calculations based on the differences in signals received by each.

Embodiments provide for technical solutions to various malicious party attack vectors. For example, in a first potential attack hypothetical, a local malicious party can act as a man-in-the-middle and can pose as the access device at the resource provider location. The local malicious party can establish a secure channel with the user device. The local malicious party can potentially obtain the ultra-wideband credentials that were generated by the user device.

Embodiments provide for mitigations to the first attack. The local malicious party can masquerade as the access device at the resource provider location to obtain ultra-wideband credentials from user devices, but does not possess a genuine user device public-private key pair with a corresponding key certificate signed by a certificate authority (e.g., ICC key pair with and its corresponding genuine certificate). Therefore, the local malicious party cannot create a second validated secure channel to a remote access device (e.g., other access device) to perform a fraudulent interaction with the remote access device using the ultra-wideband credentials obtained from the user device. The malicious party cannot present themselves as a genuine user device to the remote access device. The remote access device can only accept data (e.g., interaction data) that is received from a validated secure channel.

As another example, in a potential second attack scenario, a first malicious party acting as a man-in-the-middle may not attempt to intercept the secure channel between the user device and a remote access device, but can rather attempt to mimic the remote access device to the user device. The first malicious party can work with a second malicious party to attempt to perform a fraudulent interaction. The second malicious party can operate at the remote access device location. The second malicious party can intercept the remote access device's ultra-wideband communication packets in order to obtain ultra-wideband credentials. The second malicious party can then relay the remote ultra-wideband credentials to the first malicious party that is in proximity to the user device. The first malicious party can start an ultra-wideband anchor using the same network ID as the remote access device. The user device, acting as an ultra-wideband tag, can perform ranging to the first malicious party and thinks that the first malicious party is a nearby access device. The first malicious party can attempt to obtain interaction data fraudulently from the user device.

Embodiments provide for mitigations to the second attack. For example, embodiments can utilize ultra-wideband scrambled time stamp, secure ranging, and/or pulse reordering to provide protection against the second attack. If the first malicious party does not have the proper AES session keys then they cannot reproduce valid sequences at the local location. If the first malicious party attempted to communicate the ultra-wideband sequences at the remote access device to the local access device, then this could be caught because, even if it was possible to reproduce a valid protocol with the introduction of various delays etc., the user device's physical layer timings and calculated ranges would be significantly extended.

The secure channel, provided by embodiments, further protects against the second attack. If the first malicious party is only monitoring communications, then once the secure channel is established it is blind and cannot see the ultra-wideband credentials. The second malicious party at the remote access device location, if it is only monitoring communications, does not have the private key of the remote access device to properly read the messages.

At the application level, the user device could send the measured distance to the access device via the secure channel. The user device and/or the access device could limit the maximum allowable distances for a particular location, user device, access device, etc.

Embodiments of the disclosure have a number of advantages. For example, typically ultra-wideband communication is performed between two known devices that are paired by a user, for example, a phone and location determination device. Embodiments provide for systems and methods that allow secure on-demand ultra-wideband communication between unknown devices. For example, embodiments provide for the technical advantage of allowing two devices that have never communicated before to establish a secure ultra-wideband communication channel in a potentially malicious setting with malicious devices.

Embodiments provide for a number of additional advantages. For example, embodiments mitigate relay attacks during interactions by securely performing a ultra-wideband ranging process over a secure ultra-wideband communication channel to verify that interacting devices are in fact within a predetermined range of one another. Malicious devices attempting relay attacks outside of these ranges will be thwarted, as described in detail herein.

Although the steps in the flowcharts and process flows described above are illustrated or described in a specific order, it is understood that embodiments of the invention may include methods that have the steps in different orders. In addition, steps may be omitted or added and may still be within embodiments of the invention.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
    forming a communication channel between a user device and an access device, wherein the communication channel is a primary communication channel;
    securing the communication channel between the user device and the access device using a user device key pair in the user device and an access device ephemeral key pair in the access device;
    generating, by the access device, a session key using at least a private cryptographic key in the access device ephemeral key pair and a public cryptographic key in the user device key pair;
    using, by the access device, the session key to secure an ultra-wideband communication channel between the user device and the access device;
    determining, by the access device, a distance between the access device and the user device based on the ultra-wideband communication channel;
    comparing the distance and a predetermined threshold distance; and
    if the distance does not exceed the predetermined threshold distance, performing further communications with the user device over the primary communication channel, the user device being a payment device.

2. The method of claim 1, wherein the session key is used in a scrambled timestamp, secure ranging, or pulse reordering security process to secure the ultra-wideband communication channel.

3. The method of claim 1, wherein the session key is a first session key and wherein the method further comprises:
    generating a second session key using at least a cryptographic key of the access device ephemeral key pair, and using the second session key to form an ultra-wideband communication credential for the ultra-wideband communication.

4. The method of claim 1, wherein the user device key pair and the access device ephemeral key pair are elliptic curve cryptography (ECC) key pairs.

5. The method of claim 1, wherein the ultra-wideband communication channel is used in a relay attack prevention process, the relay attack prevention process including determining the distance between the user device and the access device.

6. The method of claim 1, wherein the primary communication channel is a close range communication channel.

7. The method of claim 1 further comprising:
    if the distance does not exceed the predetermined threshold distance, performing, by the access device, an interaction process to obtain interaction data from the user device for an interaction between a user of the user device and a resource provider of the access device;
    generating, by the access device, an authorization request message comprising at least the interaction data; and
    providing, by the access device, the authorization request message to an authorizing entity computer for authorization via a resource provider computer.

8. The method of claim 7 further comprising:
    receiving, by the access device, an authorization response message comprising an indication of whether or not the interaction is authorized.

9. The method of claim 1, wherein securing the communication channel between the user device and the access device further comprises:
    providing, by the access device, an access device ephemeral public key of the access device ephemeral key pair to the user device;
    receiving, by the access device, the public cryptographic key in the user device key pair;
    generating, by the access device, a shared secret using a user device public key and the private cryptographic key of the access device ephemeral key pair; and
    securing, by the access device, the communication channel using the shared secret.

10. The method of claim 1, wherein the access device is a POS terminal.

11. An access device comprising:
    a processor; and
    a non-transitory computer-readable medium coupled to the processor, the non-transitory computer-readable medium comprising code executable by the processor for implementing a method comprising:
        forming a communication channel between a user device and the access device, wherein the communication channel is a primary communication channel;
        securing the communication channel between the user device and the access device using a user device key pair in the user device and an access device ephemeral key pair in the access device;
        generating, by the access device, a session key using at least a private cryptographic key in the access device ephemeral key pair and a public cryptographic key in the user device key pair;
        using the session key to secure an ultra-wideband communication channel between the user device and the access device;
        determining, by the access device, a distance between the access device and the user device based on the ultra-wideband communication channel;
        comparing the distance and a predetermined threshold distance; and
        if the distance does not exceed the predetermined threshold distance, performing further communications with the user device over the primary communication channel, the user device being a payment device.

12. The access device of claim 11, wherein using the session key to secure the ultra-wideband communication channel between the user device and the access device further comprises:
    generating an authentication challenge;
    providing the authentication challenge to the user device, wherein the authentication challenge is encrypted using the session key, and wherein the user device generates a message integrity code over the authentication challenge, and provides the message integrity code to the access device in response to the authentication challenge;
    receiving the message integrity code from the user device; and
    verifying the message integrity code.

13. The access device of claim 11 further comprising, on the computer-readable medium:
    a primary communication channel creation module;
    a communication channel securing module;
    an ultra-wideband communication channel creation module; and
    an interaction processing module.

14. The access device of claim 11, wherein the method further comprises:
performing an interaction process to obtain interaction data from the user device for an interaction;
generating, by the access device, an authorization request message comprising at least the interaction data; and
providing, by the access device, the authorization request message to an authorizing entity computer for authorization.

15. The access device of claim 11, wherein the access device is a first mobile device, and wherein the user device is a second mobile device.

16. The access device of claim 11, wherein the session key is a first session key and wherein the method further comprises:
generating a second session key using at least a cryptographic key of the access device ephemeral key pair, and using the second session key to form an ultra-wideband communication credential for the ultra-wideband communication.

17. A method comprising:
forming a communication channel between a user device and an access device;
securing the communication channel between the user device and the access device using a user device key pair in the user device and an access device ephemeral key pair in the access device;
generating, by the user device, a session key using at least a private cryptographic key in the user device key pair and a public cryptographic key in the access device ephemeral key pair;
using, by the user device, the session key to secure an ultra-wideband communication channel between the user device and the access device
determining a distance between the access device and the user device based on the ultra-wideband communication channel;
comparing the distance and a predetermined threshold distance; and
if the distance does not exceed the predetermined threshold distance, performing an interaction process to provide interaction data to the access device for an interaction over the communication channel, the user device being a payment device.

18. The method of claim 17,
wherein the access device generates an authorization request message comprising at least the interaction data, provides the authorization request message to an authorizing entity computer for authorization, receives an authorization response message comprising an indication of whether or not the interaction is authorized, and provides the indication of whether or not the interaction is authorized to the user device.

19. The method of claim 17 further comprising:
providing the session key to the access device.

20. The method of claim 17, wherein the access device is a POS terminal.

* * * * *